United States Patent [19]

Lahalih et al.

[11] Patent Number: 4,898,908

[45] Date of Patent: Feb. 6, 1990

[54] ANIONIC POLYMER HYDROGELS AND A PROCESS FOR MAKING THE SAME

[75] Inventors: Shawqui Lahalih; George Hovakeemian, both of Safat, Kuwait

[73] Assignee: Kuwait Institute for Scientific Research, Safat, Kuwait

[21] Appl. No.: 301,948

[22] Filed: Jan. 26, 1989

[51] Int. Cl.[4] .................. C08J 61/00; C08K 00/00
[52] U.S. Cl. ..................... 524/593; 528/232; 528/242; 528/248; 528/259; 528/260; 528/499; 524/598; 524/714; 524/726; 524/734; 526/200; 526/204; 526/210; 526/217; 526/225
[58] Field of Search ............... 528/232, 242, 259, 260, 528/248, 499; 524/593, 598, 714, 726, 734; 526/200, 204, 210, 217, 225

[56] References Cited

U.S. PATENT DOCUMENTS

| | | | |
|---|---|---|---|
| 3,419,006 | 12/1968 | King | 128/268 |
| 3,783,872 | 1/1974 | King | 128/290 R |
| 4,058,491 | 11/1977 | Steckler | 521/38 |
| 4,060,678 | 11/1977 | Steckler | 526/260 |
| 4,064,086 | 12/1977 | Cowsar et al. | 524/601 |
| 4,071,508 | 1/1978 | Steckler | 526/287 |
| 4,160,754 | 7/1979 | Schapel et al. | |
| 4,209,605 | 6/1980 | Hoy et al. | 528/54 |
| 4,224,427 | 9/1980 | Mueller et al. | 526/93 |
| 4,267,295 | 5/1981 | Gallop et al. | 526/264 |

OTHER PUBLICATIONS

Singh, H., Vasudevan, P. and Ray, A. R., "Polymeric Hydrogels: Preparation and Biomedical Applications", (3/80).
Ratner, B. D. & Hoffman, A. S., "Synthetic Hydrogels for Biomedical Applications", (8/27/75).
Hasirci, V. N., "Synthesis and characterization of PVNO and PVNO Hydrogels", (1981).
Hoffman et al., "Preparation and application of radiation-grafted hydrogels as biomaterials", (1974).
Pedley, D. G., P. J. Skelly and B. J. Tighe, "Hydrogels in Biomedical Applications", (9/80).
Good, W. R. & Mueller, K. F., "Hydrogels and Controlled Delivery", (1981).
Good, W. R. & Hans-Joachim Cantow, "Two component hydrogels", (1981).
Berry, G. C. & M. Dror, "Modification of polyurethanes by interpenetrating network formation with hydrogels".
Macphail et al., "Effect of Viterra 2 Hydrogel on Germination, Seedling Growth and Sod Establishment of KYBG-4/80".
Susumu Yoshikaw & Donalt Lyman, "Hydrogel Formation from Copolyether urethane-ureal complex with Lithium Bromide", (1980).
Turner et al., "Highly Swollen Hydrogels: Vinyl Pyrrolidone Copolymers", (Oct. 1986).

Primary Examiner—John Kight
Assistant Examiner—Samuel A. Acquah
Attorney, Agent, or Firm—Bacon & Thomas

[57] ABSTRACT

Novel anionic polymeric hydrogels based on sulfonated amino aldehyde resins and a process for preparing such hydrogels are described. The hydrogels may include poly(N-vinyl 2-pyrrolidone) and other additives. Such hydrogels may be prepared by a four step process in which melamine and/or urea are reacted with formaldehyde, sulfonated, condensed to form a viscous gel and dried.

12 Claims, No Drawings

ANIONIC POLYMER HYDROGELS AND A PROCESS FOR MAKING THE SAME

BACKGROUND OF THE INVENTION

1. Introduction

This invention relates to anionic polymeric hydrogels and more particularly to anionic hydrogels, based on sulfonated-amino-aldehyde resins, and to a process for making such hydrogels.

2. Description of the Prior Art

Hydrogels are three dimensional networks of polymers generally covalently or ionically cross-linked and exhibit the ability to swell in water and retain significant amounts of the imbibed water. Hydrogels may be made from a variety of compositions and some are classified as neutral, anionic and cationic hydrogels. Hydrogels can also be prepared by modifying existing polymers and comprise a broad class of polymeric materials which are insoluble, but significantly swollen by water (30-95% by wt). In general, there are six basic classes of hydrogels: (1) poly(hydroxy alkyl methacrylates); (2) poly(acrylamide); poly(methacrylamide) and derivatives; (3) poly(N-vinyl-2-pyrrolidone); (4) anionic and cationic hydrogels; (5) polyelectrolyte complexes; and (6) polyvinyl alcohols.

Many of the known cross-linked hydrogels are neutral and are not ionic in character. However, anionic and cationic hydrogels have also been synthesized and used for biomedical applications. These hydrogels can be obtained by:

(1) Copolymerization of a neutral hydrogel monomer with an anionic or cationic monomer; or (2) From polyelectrolyte complexes by adding an excess of the polyanion or polycation component.

Poly(N-vinyl 2-pyrrolidone) (P-NVP) has also been used in the preparation of hydrogels. This polymer is water soluble in its uncrossed form. And because of its strong interaction with water, P-NVP can be used for preparing gels which will exhibit high water contents. One of the most important uses for such P-NVP solutions has been as a plasma extender. It is non-toxic and non-thrombogenic. It has also been used as a tablet coating and for the solubilization and stabilization of drugs. However, hydrogels consisting of P-NVP have not often been described in the biomedical literature because high concentrations of cross-linked polymers are needed to produce hydrogels with useful mechanical properties. It is also difficult to prepare homogeneous P-NVP materials. NVP is also considered to be an ideal monomer for use in covalent surface grafting systems. In addition, poly(N-vinyl 2-pyrrolidone) has been copolymerized with poly(hydroxyethyl acrylate or methacrylate) to produce hydrogels for various applications in the biomedical field such as hydrogel contact lenses.

Although hydrogels have been known for many years, it is only within the past ten years, that scientists have recognized the true potential for these polymers. For example, scientists have learned that such materials are compatible with human tissue, and that negatively charged surfaces are less thrombogenic than positively charged ones because blood cells have a negative charge. It was also reported that polyelectrolyte complexes containing excess anionic component were found to have the lowest thrombogenicity in vivo studies. However, applications of hydrogels are usually limited to materials with a water content up to 80%. This is because if the water content is increased further, the decline in mechanical properties is unacceptable for most purposes. This can be overcome to a degree by:

(1) Copolymerization of hydrophilic monomers, with hydrophobic monomers; and (2) Grafting of hydrophillic monomers on stronger polymeric supports by radiation cross-linking or by dipcoating of the hydrophillic monomer on to the hydrophobic substrate.

Hydrogels have been used in the biomedical field for various applications such as (1) contact lenses, (2) artificial organs, (3) tissue substrates, (4) hemodialysis membranes, (5) burn wound dressing, and (6) drug carriers. They have also been used in the agricultural field. For example, a polyacrylamide copolymer has been developed by Agricultural Polymers Ltd. (UK) as a hydrogel for soil. It is reported that water uptake can go up to a few hundred times the dry weights of the polymer. It was also reported that stress in plants due to a shortage of water can be drastically reduced by the use of such material. Another example is the use of radiation cross-linked poly(ethylene oxide) by Union Carbide as a soil modifier. This product is being distributed as Viterra I and II. However, the use of hydrogel materials for agricultural purposes are reported to be economically unattractive.

The fact that the low-molecular-weight compounds can diffuse through swollen hydrophillic gels can also be used to achieve a slow release physiologically active substance incorporated in the gel. As a result, active species of different functions can be complexed with these hydrogels. Such hydrogel forming polymers work by virtue of their polyhydroxyl functionality (—OH, C—O—C, —C=O), and are therefore used as polymeric inert carriers which control the release from these carriers. The active substances may be drugs, agricultural chemicals or fragrances. Hydrogels are also used as antifogging coatings.

Another application for polymeric hydrogels is for ultrafiltration and reverse osmosis (RO) membranes. RO membranes prepared from polyelectrolyte complex resins were found to display fluxes about three orders of magnitude higher than those made from cellulose acetate. These menbranes exhibit a striking rejection of calcium and other divalent ions and have been evaluated as saline water pretreatment filters in membrane desalination to prevent buildup of a fouling layer on the surface of cellulose acetate membrane.

Thus, there is a need for new polymeric hydrogels to meet the demand for more economical and more versatile products. Accordingly, a new composition of hydrogels having broader applications has now been developed. Such hydrogels can be economically produced, are nontoxic and are believed to be suitable for use as a source of slow release fertilizer in addition to their function as a water-reservoir.

SUMMARY OF THE INVENTION

In essence the present invention comprises an anionic polymeric hydrogel consisting essentially of sulfonated amino formaldehyde resin with or without a poly(vinyl pyrrolidone). In a preferred embodiment the poly(vinyl pyrrolidone) is present and has an average molecular weight ranging from about 15,000 to 90,000. The hydrogels according to the present invention have the capability to absorb at least three (3) times and up to about fifteen (15) times their own weight of deionized water.

The present invention also contemplates a novel process for preparing anionic polymer hydrogels by reacting melamine and/or urea with formaldehyde with a formaldehyde to primary amino group ratio within the range of 1:1 to 1.33:1 in an aqueous solution at 70° to 80° C., preferably at about 80° C. The pH of the solution is raised to about 9 to 11, preferably about 10 by the addition of an alkaline material such as a 12N sodium hydroxide (NaOH) solution, and the reaction is allowed to continue for 10 to 20 minutes or until the resulting solution becomes clear. A sulfonating agent such as sodium metabisulfite is then added to the solution in an amount to provide a ratio of sulfite group to amino group in the range of 0.8:1 to 1.2:1. The solution is maintained at about the same temperature and pH for a period of about 30 to 90 minutes or until major sulfonation occurs. After sulfonation, the pH of the solution is reduced to about 4 to 6, preferably about 5 to 5.3 by the addition of an acid such as sulfuric acid. The reaction temperature of about 80° C. is maintained and the reaction continued for about 20 to 90 minutes. At this stage additives such as poly(N-vinyl 2-pyrrolidone), ethylene glycol, starch and others may be added. And, after the addition of an additive, the reaction continues until any additives dissolve and the solution becomes clear. And then, the reaction is continued for 30 to 180 minutes or until a highly viscous liquid or gel is formed. The reaction is stopped by cooling the viscous liquid to room temperature and results in a viscous gel. This highly viscous gel is then dried by heat, vacuum or freeze-drying to form a hydrogel. In the aforementioned process, various amounts and average molecular weights of poly(N-vinyl 2-pyrrolidone) were added. For example, the average molecular weight of P-NVP ranged from 15,000 to 90,000.

The following example will further illustrate the present invention.

DETAILED DESCRIPTION OF INVENTION

Example 1

A formaline solution was prepared by dissolving 37.2 grams (g) of 96% paraformaldehyde in 173 ml. of water. The pH of the mixture was raised by the addition of 12N NaOH solution and the mixture was heated to 80° C. and maintained at that temperature for 30 minutes. After the solution became clear, an additional 168 ml. of water was added and the solution was maintained at about 80° C. for about 15 minutes. The pH of the solution was then raised to 10 by the addition of 12N NaOH and 50 g. of melamine. It was noted that a rise in temperature of 1.4° C. took place. Fifteen minutes after the addition of melamine, the pH was measured at 10.35. The pH was then adjusted to 10 by addition of 12N $H_2SO_4$. The formaldehyde to melamine ratio was 3:1.

In the second step of the process, sodium metabisulfite (30.16 g) and 120 ml. of water were then added to the solution. The temperature rose to 85.2° C. and was cooled down to 80° C. The pH measured after one hour of reaction was 9.5. The sulfite ion to melamine ratio was 0.80:1.

The third step starts by lowering the solution pH down to 5.05 by adding 12N $H_2SO_4$ while maintaining the same reaction temperature of 80° C. The reaction continued for 40 minutes where a very viscous liquid was realized. A gel was formed after the solution was left for 2-3 hours at room temperature. The water uptake of the freeze-dried gel was 750% based on the dry weight of the gels when deionized water was used.

Example 2-5

The same procedure of example 1 was followed except that after the reaction continued for 40 minutes in the third step, 30 g. of poly(vinyl pyrrolidone) of weight average molecular weight 90,000 was added with 7 g. ethylene glycol, and the reaction was continued for additional 40 minutes, 60 minutes, 90 minutes and 120 minutes, respectively. The water uptake of these hydrogels is shown in Table 1.

Example 6-10

The same procedure of example 1 was followed except that after the reaction continued for 60 minutes in the third step, 30 g. of poly(vinyl pyrrolidone) of weight average molecular weight of 90,000 was added with 7 g. ethylene glycol, and the reaction continued for an additional 60 minutes, 90 minutes, 120 minutes and 180 minutes, respectively. The water uptake of these hydrogels is shown in Table 1.

Example 11-13

The same procedure of example 1 was followed except that after the reaction continued for 20 minutes in the third step, 30 g. of poly(vinyl pyrrolidone) of weight average molecular weight of 90,000 was added with 7 g. ethylene glycol. The reaction was continued for an additional 40 minutes, 60 minutes, 90 minutes and 120 minutes. The water uptake of these hydrogels is shown in Table 1.

Example 14

The same procedure of example 1 was followed except that after the reaction continued for 60 minutes in the third step, 50 g. of poly(vinyl pyrrolidone) of weight average molecular weight of 90,000 was added with 7 g. ethylene glycol and the reaction continued for 180 minutes. The water uptake of these hydrogels is shown in Table 1.

Example 15

The same procedure of example 1 was followed except that after the reaction continued for 90 minutes in the third step, 50 g. of poly(vinyl pyrrolidone) of weight average molecular weight of 90,000 was added with 7 g. ethylene glycol and the reaction continued for 120 minutes. The water uptake of these hydrogels is shown in Table 1.

Example 16

The same procedure of example 1 was followed except that after the reaction continued for 60 minutes in the third step, 50 g. of poly(vinyl pyrrolidone) of weight average molecular weight of 15,000 was added with 7 g. ethylene glycol and the reaction continued for 90 minutes. The water uptake of these hydrogels is shown in Table 1.

Example 17-18

The same procedure of example 1 was followed except that after the reaction continued for 40 minutes in the third step, 18 g. of poly(vinyl pyrrolidone) of weight average molecular weight of 90,000 was added with 7 g. ethylene glycol and the reaction continued for 40 minutes and 90 minutes, respectively. The water uptake of these hydrogels is shown in Table 1.

Example 19-20

The same procedure of example 1 was followed except that after the reaction continued for 60 minutes in the third step, 18 g. of poly(vinyl pyrrolidone) of weight average molecular weight of 90,000 was added with 7 g. ethylene glycol and the reaction continued for 40 minutes and 180 minutes, respectively. The water uptake of these hydrogels is shown in Table 1.

Example 21-22

The same procedure of example 1 was followed except that after the reaction continued for 80 minutes in the third step, 18 g. of poly(vinyl pyrrolidone) of weight average molecular weight 90,000 was added with 7 g. ethylene glycol and the reaction continued for 40 minutes and 90 minutes, respectively. No gel was formed. The water uptake of these hydrogels is shown in Table 1.

Example 23-25

The same procedure of example 1 was followed except that after the reaction continued for 60 minutes in the third step, 10 g. of poly(vinyl pyrrolidone) of weight average molecular weight of 90,000 was added with 7 g. of ethylene glycol and the reaction continued for 40 minutes, 90 minutes and 180 minutes, respectively. The water uptake of these hydrogels is shown in Table 1.

Example 26-28

The same procedure of example 1 was followed except that after the reaction continued for 20 minutes, 40 minutes and 60 minutes, respectively, in the third step, 10 g. of poly(vinyl pyrrolidone) of weight average molecular weight of 90,000 was added with 7 g. ethylene glycol and 30 g. of starch and the reaction continued for an additional 40 minutes. The water uptake of these hydrogels is shown in Table 1.

Example 29-30

The same procedure of example 1 was followed except that after the reaction continued for 20 minutes in the third step, 18 g. of poly(vinyl pyrrolidone) of weight average molecular weight of 90,000 was added with 7 g. ethylene glycol and 30 g. of starch and the reaction continued for 40 minutes. The water uptake of these hydrogels is shown in Table 1.

Example 31-32

The same procedure of example 1 was followed except that after the reaction continued for 40 minutes in the third step, 18 g. of poly(vinyl pyrrolidone) of weight average molecular weight of 90,000 and 15,000 was added with 7 g. ethylene glycol and 30 g. starch and the reaction continued for 15 minutes. The water uptake of these hydrogels is shown in Table 1.

Example 33

The same procedure of example 1 was followed except that the reaction continued for 40 minutes in the third step, 18 g. of poly(vinyl pyrrolidone) of weight average molecular weight of 90,000 was added with 7 g. ethylene glycol and 50 g. of starch and the reaction continued for 15 minutes. The water uptake of these hydrogels is shown in Table 1.

Example 34-35

The same procedure of example 1 was followed except that after the reaction continued for 40 minutes in the third step, 18 g. of poly(vinyl pyrrolidone) of weight average molecular weight of 90,000 was added with 30 g. of starch and 10 g. of HEC and 10 g. of PVA of average molecular weight of 100,000 and the reaction continued for 15 minutes. The water uptake of these hydrogels is shown in Table 1.

Example 36-37

The same procedure of example 1 was followed except that after the reaction continued for 40 minutes in the third step, 30 g. of poly(vinyl pyrrolidone) of weight average molecular weight of 90,000 was added with 7 g. ethylene glycol and 30 g., and 50 g. of starch added and the reaction continued for 15 minutes. The water uptake of these hydrogels is shown in Table 1.

TABLE 1

Water Uptake of Various Preparations with Different Composition and Varying Reaction Time in the Third Step of the Reaction Procedure[a]

| Example No. | Additives to SMF Resins[b] | | | | Third Step Reaction Time | | Deionized Water Uptake (%) |
| --- | --- | --- | --- | --- | --- | --- | --- |
| | Poly(vinyl[c] pyrrolidone) (g) | Ethylene Glycol (g) | Starch (g) | Others (g) | Before Addition $t_3$ (min) | After addition $t_3$ (min) | |
| 1 | 0.0 | 0.0 | 0.0 | 0.0 | 40.0 | 0.0 | 700 |
| 2 | 30.0 | 7.0 | 0.0 | 0.0 | 40.0 | 40.0 | 750 |
| 3 | 30.0 | 7.0 | 0.0 | 0.0 | 40.0 | 60.0 | 500 |
| 4 | 30.0 | 7.0 | 0.0 | 0.0 | 40.0 | 90.0 | 700 |
| 5 | 30.0 | 7.0 | 0.0 | 0.0 | 40.0 | 120.0 | 400 |
| 6 | 30.0 | 7.0 | 0.0 | 0.0 | 60.0 | 40.0 | 400 |
| 7 | 30.0 | 7.0 | 0.0 | 0.0 | 60.0 | 60.0 | 1000 |
| 8 | 30.0 | 7.0 | 0.0 | 0.0 | 60.0 | 90.0 | 1200 |
| 9 | 30.0 | 7.0 | 0.0 | 0.0 | 60.0 | 120.0 | 1000 |
| 10 | 30.0 | 7.0 | 0.0 | 0.0 | 60.0 | 180.0 | 500 |
| 11 | 30.0 | 7.0 | 0.0 | 0.0 | 60.0 | 60.0 | 600 |
| 12 | 30.0 | 7.0 | 0.0 | 0.0 | 60.0 | 90.0 | 750 |
| 13 | 30.0 | 7.0 | 0.0 | 0.0 | 60.0 | 120.0 | 550 |
| 14 | 50.0 | 7.0 | 0.0 | 0.0 | 60.0 | 180.0 | 400 |
| 15 | 50.0 | 7.0 | 0.0 | 0.0 | 90.0 | 120.0 | 450 |
| 16 | 50.0 | 7.0 | 0.0 | 0.0 | 60.0 | 90.0 | No gel |
| 17 | 18.0 | 7.0 | 0.0 | 0.0 | 40.0 | 40.0 | 650 |
| 18 | 18.0 | 7.0 | 0.0 | 0.0 | 40.0 | 90.0 | 300 |
| 19 | 18.0 | 7.0 | 0.0 | 0.0 | 60.0 | 40.0 | 600 |
| 20 | 18.0 | 7.0 | 0.0 | 0.0 | 60.0 | 180.0 | 300 |
| 21 | 18.0 | 7.0 | 0.0 | 0.0 | 80.0 | 40.0 | 300 |
| 22 | 18.0 | 7.0 | 0.0 | 0.0 | 80.0 | 90.0 | 550 |
| 23 | 10.0 | 7.0 | 0.0 | 0.0 | 60.0 | 40.0 | 550 |

TABLE 1-continued

Water Uptake of Various Preparations with Different Composition and Varying Reaction Time in the Third Step of the Reaction Procedure[a]

| Example No. | Additives to SMF Resins[b] | | | | Third Step Reaction Time | | Deionized Water Uptake (%) |
|---|---|---|---|---|---|---|---|
| | Poly(vinyl[c] pyrrolidone) (g) | Ethylene Glycol (g) | Starch (g) | Others (g) | Before Addition $t_3$ (min) | After addition $t_3$ (min) | |
| 24 | 10.0 | 7.0 | 0.0 | 0.0 | 60.0 | 90.0 | 900 |
| 25 | 10.0 | 7.0 | 0.0 | 0.0 | 60.0 | 180.0 | 300 |
| 26 | 10.0 | 7.0 | 30.0 | 0.0 | 20.0 | 40.0 | 300 |
| 27 | 10.0 | 7.0 | 30.0 | 0.0 | 40.0 | 40.0 | 700 |
| 28 | 10.0 | 7.0 | 30.0 | 0.0 | 60.0 | 40.0 | 800 |
| 29 | 18.0 | 7.0 | 0.0 | 0.0 | 20.0 | 40.0 | 500 |
| 30 | 18.0 | 7.0 | 30.0 | 0.0 | 20.0 | 40.0 | 600 |
| 31 | 18.0 | 7.0 | 30.0 | 0.0 | 40.0 | 15.0 | 800 |
| 32 | 18.0 | 7.0 | 30.0 | 0.0 | 40.0 | 15.0 | 600 |
| 33 | 18.0 | 7.0 | 50.0 | 0.0 | 40.0 | 15.0 | 600 |
| 34 | 18.0 | 7.0 | 30.0 | 10.0 (HEC)[d] | 40.0 | 15.0 | 300 |
| 35 | 18.0 | 7.0 | 30.0 | 10.0 (PVA)[e] | 40.0 | 15.0 | 300 |
| 36 | 30.0 | 7.0 | 30.0 | 0.0 | 40.0 | 15.0 | 400 |
| 37 | 30.0 | 7.0 | 50.0 | 0.0 | 40.0 | 15.0 | 600 |

[a]Reaction conditions of step 1 and step 2 are the same for all runs
Step 1: $T_1 = 80°$ C., $t_1 = 15$ min, $pH_1 = 10.0$
Step 2: $T_2 = 80°$ C., $t_2 = 60$ min, $pH_2 = 10.0$
[b]SMF is sulfonated melamine formaldehyde resins that exist in the solution at approximately 20% solids or total of 117 g of solids in solution
[c]Poly(vinyl pyrrolidone) weight average molecular weight is 90,000 for all examples except examples 16 and 32 where the weight average molecular weight is 15,000
[d]HEC is hydroxy ethyl cellulose
[e]PVA is polyvinyl alcohol The invention has been described in connection with the foregoing examples for illustrative purposes; however, it should be recognized that variations may be made in proportions, procedures and materials without departing from the scope of the invention as defined by the appended claims.

What is claimed is:

1. An anionic polymeric hydrogel consisting essentially of sulfonated aminoformaldehyde resin having a capability to absorb at least three (3) times its own weight of deionized water.

2. An anionic polymeric hydrogel according to claim 1 wherein the sulfonated amino formaldehyde resin is selected from the group consisting of sulfonated urea formaldehyde, sulfonated melamine formaldehyde, and sulfonated urea-melamine formaldehyde.

3. An anionic polymeric hydrogel according to claim 2 which includes a poly(vinyl pyrrolidone) having an average molecular weight ranging from about 15,000 to 90,000.

4. An anionic polymeric hydrogel according to claim 3 which includes ethylene glycol.

5. An anionic polymeric hydrogel according to claim 4 which includes starch.

6. An anionic polymeric hydrogel according to claim 5 which includes a water soluble polymer selected from the group consisting of polyvinyl alcohol, hydroxy ethyl cellulose and mixtures thereof.

7. A process for preparing anionic sulfonated aminoformaldehyde hydrogels comprising the steps of:
   (a) reacting melamine and/or urea with formaldehyde in an aqueous media at 70°–80° C. and a solution pH of between 9–11 for a period of 10 to 20 minutes with a formaldehyde to amino group ratio within the range of 1:1 to 1.33:1 and allowing the resulting solution to become clear;
   (b) sulfonating the solution from step (a) by the addition of a sulfonating agent in a ratio of sulfite group to amino group in the range of about 0.8:1 to 1.2:1 and maintaining the pH of the solution between about 9 and 11 and the temperature between about 70°–80° C. for a period of between about 30 to 90 minutes or until major sulfonation occurs;
   (c) reducing the pH of the solution to about 4–6 after sulfonation and maintaining the reaction temperature at about 70°–80° C. until a very viscous liquid or gel is formed and cooling the viscous liquid to room temperature to thereby form a gel; and
   (d) drying the gel obtained from step (c) to thereby form an anionic hydrogel.

8. A process for preparing anionic sulfonated aminoformaldehyde hydrogels according to claim 7 wherein an additive such as poly(N-vinyl 2-pyrrolidone), ethylene glycol or starch is added in step (c) after reducing the pH and after maintaining the reaction temperature for between 20 to 90 minutes, and after such addition continuing the reaction for another 30 to 180 minutes.

9. A process for preparing anionic sulfonated aminoformaldehyde hydrogels according to claim 8 wherein the reaction temperatures in steps (a), (b) and (c) are maintained at about 80° C.

10. A process for preparing anionic suflonated aminoformaldehyde hydrogels according to claim 9 wherein the pH of the solution in step (a) is adjusted to about 10.

11. A process for preparing anionic sulfonated aminoformaldehyde hydrogels according to claim 10 wherein the pH of the solution in step (c) is adjusted to about 5 to 5.3.

12. A process for preparing anionic sulfonated aminoformaldehyde hydrogels according to claim 11 wherein the viscous liquid obtained in step (c) is freeze-dried.